No. 826,507. PATENTED JULY 17, 1906.
C. L. HOLM.
BOX BEARING FOR FAST ROTATING SHAFTS.
APPLICATION FILED MAR. 6, 1903.
2 SHEETS—SHEET 1.
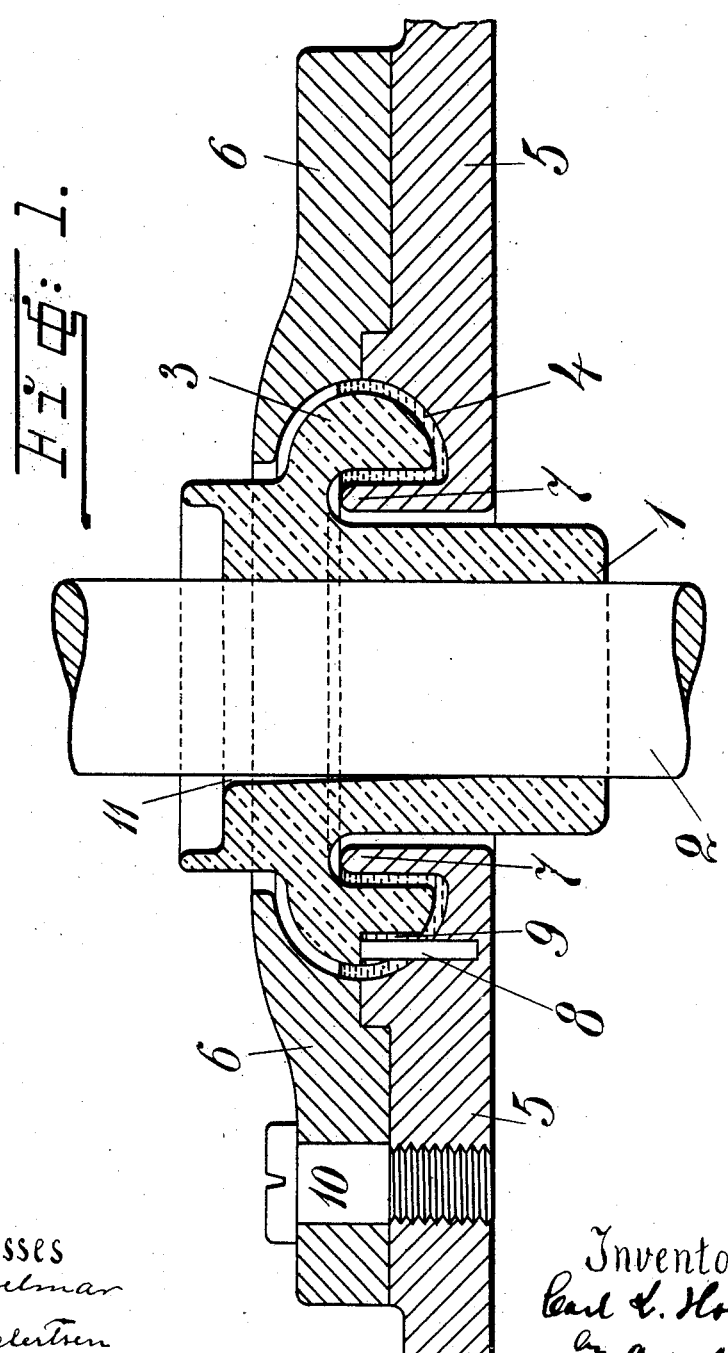
Witnesses
Evald Delmar
Einar Gelertsen
Inventor
Carl L. Holm
by Oerdahl
his Atty No. 826,507. PATENTED JULY 17, 1906.
C. L. HOLM.
BOX BEARING FOR FAST ROTATING SHAFTS.
APPLICATION FILED MAR. 6, 1903.
2 SHEETS—SHEET 2.
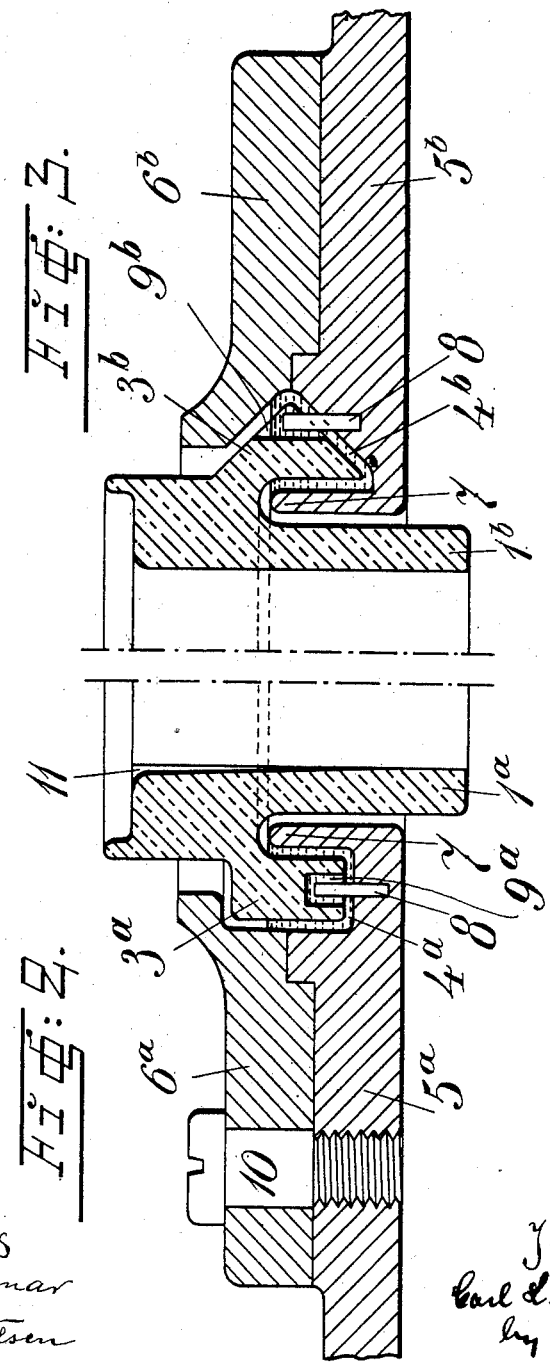
Witnesses
Evald Delmar
Einar Petersen
Inventor
Carl L. Holm
by his attorney

UNITED STATES PATENT OFFICE.

CARL LUDVIG HOLM, OF STOCKHOLM, SWEDEN, ASSIGNOR TO NYA AKTIEBOLAGET RADIATOR, OF STOCKHOLM, SWEDEN.

BOX-BEARING FOR FAST-ROTATING SHAFTS.

No. 826,507.  Specification of Letters Patent.  Patented July 17, 1906.

Application filed March 6, 1903. Serial No. 146,581.

*To all whom it may concern:*

Be it known that I, CARL LUDVIG HOLM, a subject of the King of Sweden and Norway, and a resident of Stockholm, Sweden, have invented a new and useful Improvement in Box-Bearings for Fast-Rotating Shafts, of which the following is a specification, reference being had to the drawings accompanying and forming a part hereof.

This invention relates to box-bearings for fast-rotating shafts, such as centrifugal drum-shafts and the like.

The object of the present invention is to provide a box-bearing which will be simple in its construction and reliable in the performance of its function.

The invention consists, briefly, in having in one element of the bearing one or more cups or holders containing liquids—such as glycerin, oil, and the like—and fixed in relation to the bearing and in attaching one or more projections to the other element of the bearing, so that the same will project into the liquids of the said holders. The said cups or holders are of such dimensions that the bearing may deflect from its central position sufficient enough to correspond to the oscillations or vibrations of the shaft, the liquid thereby offering a certain resistance against the side movements of the projections, so as to assist the centration of the shaft.

The invention also consists in the combinations and arrangements of parts hereinafter described and claimed.

The same reference-figures denote the same or corresponding parts throughout.

In the accompanying drawings I have illustrated some ways of carrying out my invention.

Figures 1, 2, and 3 show each a constructional form of the same in vertical sections.

1, $1^a$, and $1^b$ represent the bushing of the box-bearing, which incloses a spindle or shaft 2 of a centrifugal drum or any other fast-rotating part requiring automatic centration. The said bushing may suitably be provided with a ring-shaped downwardly-projecting flange or collar 3, $3^a$, and $3^b$, entering a ring-shaped liquid-holder 4, $4^a$, and $4^b$ in any fixed part or parts surrounding the bushing 1, $1^a$, and $1^b$. The said liquid-holder may, as shown, be arranged in a bottom 5, $5^a$, and $5^b$, forming a part of or attached to the frame of the machine, and in a plate 6, $6^a$, and $6^b$, fixed to the said bottom by means of screws 10 or the like, serving to prevent the axial movement of the bushing. In the drawings I have shown three different shapes of the said flange or collar 3, $3^a$, and $3^b$; but it is obvious that the same may be of any desired shape, the latter depending, essentially, on the different liquid resistance required for different purposes. The part of the flange or collar 3, $3^a$, and $3^b$ projecting into the liquid of the said holder 4, $4^a$, and $4^b$ is of somewhat smaller dimensions than the latter, so that the collar has a certain play in the said holder, the bushing having thus opportunity to partake in the eventual vibrations of the shaft. The bushing may be prevented from touching the bottom of the liquid-holder 4, $4^a$, and $4^b$—for instance, by means of lugs or the like (not shown) provided on the machine-frame, against which lugs or the like the lower end of the bushing may bear. The resistance of the liquid against side movements of the shaft, bushing, and projections acts as a piston in a dash-pot, so as to prevent sudden deflections of the shaft from its central position, but will permit the automatic centration of the shaft. The liquid which I prefer to use is glycerin or oil; but obviously, also, other liquids may be used. The two ring-shaped chambers of the holder 4, $4^a$, and $4^b$, divided from each other by the flange or collar 3, $3^a$, and $3^b$, form two communicating vessels, and the liquid introduced in the said holder 4, $4^a$, and $4^b$ will be retained to a level, depending on the height of the inner wall 7 of the holder 4, $4^a$, and $4^b$. The said wall 7 should preferably reach somewhat above one-half of the height of the said flange or collar 3, $3^a$, and $3^b$. The bushing 1, $1^a$, and $1^b$ may be prevented from partaking in the rotation of the shaft 2 by any suitable means, such as one or more pins 8, fixed in the bottom 5, $5^a$, and $5^b$ and engaging with corresponding borings or recesses 9, $9^a$, and $9^b$ in the flange 3, $3^a$, and $3^b$. The said pins may preferably be made so weak as to be broken off, so as to allow the bushing to rotate with the shaft in case the bearing should happen to run hot. The said borings or recesses may be somewhat wider than the pins, so as to give the bushing the necessary play.

11 represents a groove for introducing oil in the bearing.

The bearing device described above is put in order and works in the following manner: After the bushing 1, 1ª, and 1ᵇ has been inserted from above and turned until the pin 8 engages the recess 9, 9ª, and 9ᵇ the plate 6, 6ª, and 6ᵇ is fixed to the bottom 5, 5ª, and 5ᵇ by means of the screws 10. As easily understood, the fixing of the plate 6, 6ª, and 6ᵇ requires no special accuracy. The liquid is thereupon poured into the liquid-holder 4, 4ª, and 4ᵇ. When the shaft is put in motion and the bushing, on account of the vibrations of the shaft, is moved sidewise, the liquid will check such movements without preventing the centration of the shaft. It may happen that a part of the liquid will thereby be forced over the edge of the wall 7, and therefore new liquid should from time to time be poured into the liquid-holder 4, 4ª, and 4ᵇ.

The arrangement described above and illustrated in the drawings may obviously be reversed, so that the liquid-holder is arranged in the bushing, while the parts projecting into the said liquid-holder are provided on the fixed parts surrounding the bushing.

Having now described my invention and in what manner the same may be performed, what I claim as new, and desire to secure by Letters Patent, is—

A shaft-centering device comprising a perforated member having a groove around said perforation, the groove forming a fluid-holder, a shaft-bushing having an annular flange loosely entering the fluid-holder, a second perforated member fitted over the first perforated member, and means to prevent the bushing from rotating with the shaft.

In testimony whereof I have signed my name to this specification in the presence of two subscribing witnesses.

CARL LUDVIG HOLM.

Witnesses:
 JOHN DELMAR,
 KARL RUNCSKOG.